(12) United States Patent
Ho

(10) Patent No.: US 9,872,544 B2
(45) Date of Patent: Jan. 23, 2018

(54) PORTABLE ROTATING SELF-LOCK TYPE QUICK DISMANTLING LOCK CATCH DEVICE

(71) Applicants: SHENZHEN DEGENA ELECTRONICS LTD., Guangdong (CN); TECHSPORT LTD, Hong Kong (CN)

(72) Inventor: Waiman Ho, Hong Kong (HK)

(73) Assignee: TECHSPORT LTD, Hong Kong, OT (HK)

( * ) Notice: Subject to any disclaimer, the term of this patent is extended or adjusted under 35 U.S.C. 154(b) by 0 days.

(21) Appl. No.: 14/891,426

(22) PCT Filed: Jan. 20, 2015

(86) PCT No.: PCT/CN2015/071084
§ 371 (c)(1),
(2) Date: Nov. 16, 2015

(87) PCT Pub. No.: WO2015/106725
PCT Pub. Date: Jul. 23, 2015

(65) Prior Publication Data
US 2016/0316862 A1    Nov. 3, 2016

(30) Foreign Application Priority Data
Jan. 20, 2014   (CN) ............ 2014 2 0032601 U

(51) Int. Cl.
*F16M 11/04* (2006.01)
*F16B 21/04* (2006.01)
(Continued)

(52) U.S. Cl.
CPC ............ *A44B 99/005* (2013.01); *F16B 21/04* (2013.01); *F16M 11/041* (2013.01); *H04M 1/026* (2013.01)

(58) Field of Classification Search
None
See application file for complete search history.

(56) References Cited

U.S. PATENT DOCUMENTS

| | | | | |
|---|---|---|---|---|
| 3,758,198 A | * | 9/1973 | Kanie | G03B 17/12 |
| | | | | 359/828 |
| RE30,680 E | * | 7/1981 | Kress | B23Q 1/0063 |
| | | | | 403/349 |

(Continued)

*Primary Examiner* — Gennadiy Tsvey
(74) *Attorney, Agent, or Firm* — Furr Law Firm; Jeffrey Furr

(57) ABSTRACT

The utility model provides a portable rotary self-locking fast-disassembling locker, including a first fixing element and a second fixing element, wherein the first fixing element is provided with an embedding recess, the side wall of the embedding recess is provided with a protrusion portion, the protrusion portion is provided with an embedding clamping groove and a locking groove, the embedding clamping groove is located at one side of the protrusion portion, the locking groove is located at the other side of the protrusion portion, the second fixing element is connected with an elastic locking mechanism, the second fixing element is provided with a fixation clamp, the elastic locking mechanism includes a spring and a locking portion connected with the spring, the fixation clamp is matched with the embedding clamping groove, and the locking portion is matched with the locking groove. The utility model has the advantageous effects that: the quick and rotary connection of the first fixing element and the second fixing element can be implemented by means of the match between the fixation clamp and the embedding clamping groove, and then by means of the match between the locking portion and the locking groove; moreover, the utility model has the advantages of portability as well as convenient assembling and disassembling.

10 Claims, 4 Drawing Sheets

(51) Int. Cl.
    *A44B 99/00*    (2010.01)
    *H04M 1/02*    (2006.01)

(56)           References Cited

U.S. PATENT DOCUMENTS

| 4,281,895 | A | * | 8/1981 | Mohr | G02B 7/007 |
|---|---|---|---|---|---|
| | | | | | 285/401 |
| 4,307,954 | A | * | 12/1981 | Ludwig | G03B 17/14 |
| | | | | | 359/828 |
| 4,640,478 | A | * | 2/1987 | Leigh-Monstevens | B60T 11/16 |
| | | | | | 248/27.1 |
| 4,659,203 | A | * | 4/1987 | Niwa | G02B 7/14 |
| | | | | | 359/828 |
| 5,626,435 | A | * | 5/1997 | Wohlhuter | B60D 1/52 |
| | | | | | 280/416.1 |
| 5,642,235 | A | * | 6/1997 | Ichikawa | G02B 7/02 |
| | | | | | 359/811 |
| 5,924,978 | A | * | 7/1999 | Koeda | G02B 6/0006 |
| | | | | | 600/131 |
| 8,573,868 | B2 | * | 11/2013 | Hasuda | G03B 17/14 |
| | | | | | 359/828 |
| RE45,179 | E | * | 10/2014 | Bodkin | A45F 5/02 |
| | | | | | 190/119 |
| D764,064 | S | * | 8/2016 | Vezina | D24/187 |
| 9,421,654 | B2 | * | 8/2016 | Ochi | B23F 23/06 |
| 2004/0129186 | A1 | * | 7/2004 | Curiger | A47B 13/021 |
| | | | | | 108/157.16 |
| 2007/0092333 | A1 | * | 4/2007 | Viscount | A63C 19/062 |
| | | | | | 403/349 |
| 2007/0102605 | A1 | * | 5/2007 | Vela | B60T 13/567 |
| | | | | | 248/221.12 |
| 2007/0225031 | A1 | * | 9/2007 | Bodkin | A45C 3/001 |
| | | | | | 455/550.1 |
| 2012/0120659 | A1 | * | 5/2012 | Lopez | F21V 19/045 |
| | | | | | 362/249.02 |
| 2013/0034989 | A1 | * | 2/2013 | Vogt | F21V 19/003 |
| | | | | | 439/485 |
| 2014/0031760 | A1 | * | 1/2014 | Mercer | A61M 5/2448 |
| | | | | | 604/191 |
| 2014/0071548 | A1 | * | 3/2014 | Sanford | F16B 21/04 |
| | | | | | 359/828 |

* cited by examiner

PORTABLE ROTATING SELF-LOCK TYPE QUICK DISMANTLING LOCK CATCH DEVICE

TECHNICAL FIELD

The utility model relates to a locker, and more particularly, to a portable rotary self-locking fast-disassembling locker.

BACKGROUND

A fast-disassembling locker is a fixing device used between objects. The present fast-disassembling locker is inconvenient to assemble and disassemble, which wastes time and efforts.

SUMMARY

In order to solve the problems in the related art, the utility model provides a portable rotary self-locking fast-disassembling locker.

The utility model provides a portable rotary self-locking fast-disassembling locker, including a first fixing element and a second fixing element. The first fixing element is provided with an embedding recess, the side wall of the embedding recess is provided with a protrusion portion, the protrusion portion is provided with an embedding clamping groove and a locking groove, the embedding clamping groove is located at one side of the protrusion portion close to the bottom of the embedding recess, the locking groove is located at one side of the protrusion portion far away from the bottom of the embedding recess, the second fixing element is connected with an elastic locking mechanism, the second fixing element is provided with a fixation clamp, the elastic locking mechanism includes a spring and a locking portion connected with the spring, the fixation clamp is matched with the embedding clamping groove, and the locking portion is matched with the locking groove.

As a further improvement of the utility model, the embedding recess is round, at least two protrusion portions are provided and are uniformly arranged along the circumferential direction of the embedding recess in a spacing manner, the protrusion direction of the protrusion portion is to protrude along the radial direction of the embedding recess towards the circle center direction of the embedding recess, and an avoidance gap for the fixation clamp to pass is arranged between adjacent protrusion portions.

As a further improvement of the utility model, one end of the embedding clamping groove is an opening, the embedding clamping groove is communicated with the avoidance gap through the opening, and the protrusion portion blocks the other end of the embedding clamping groove.

As a further improvement of the utility model, one side of the protrusion portion is provided with an import bevel, and the opening of the protrusion portion is located on the import bevel.

As a further improvement of the utility model, one side of the locking portion is provided with an active import bevel matched with the import bevel.

As a further improvement of the utility model, one end of the locking portion is provided with a button, the other end of the locking portion is provided with a spring erection column, and the spring is arranged on the spring erection column.

As a further improvement of the utility model, the elastic locking mechanism further comprises a safety latch switch, the locking portion is connected with a safety latch strut, and the safety latch strut is matched with the safety latch switch.

As a further improvement of the utility model, two locking portions are provided and are respectively connected at the two ends of the spring.

As a further improvement of the utility model, the portable rotary self-locking fast-disassembling locker further comprises a mobile terminal, and the first fixing element is internally arranged or externally hung on the mobile terminal As a further improvement of the utility model, the mobile terminal is a mobile phone.

The utility model has the advantageous effects that: through the foregoing scheme, the quick and rotary connection of the first fixing element and the second fixing element can be implemented by means of the match between the fixation clamp and the embedding clamping groove, and then by means of the match between the locking portion and the locking groove; moreover, the utility model has the advantages of portability as well as convenient assembling and disassembling.

DETAILED DESCRIPTION

The utility model will be further described in details hereinafter with reference to the drawings and specific embodiments.

Figure 1:
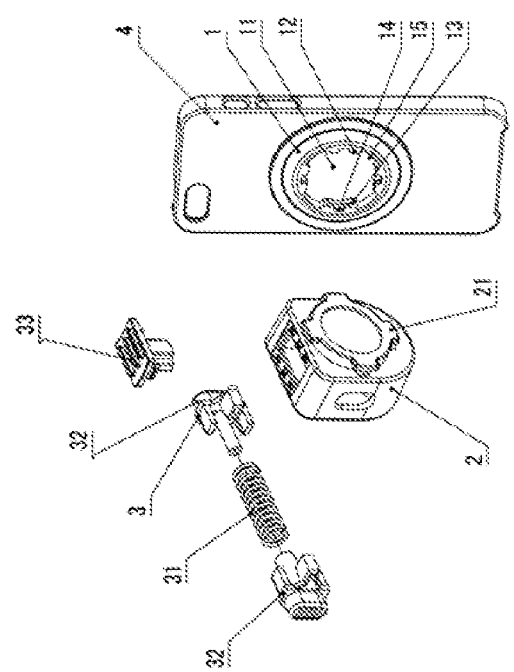
FIG. 1 is an exploded structure schematic view of a portable rotary self-locking fast-disassembling locker according to the utility model.
Figure 2:
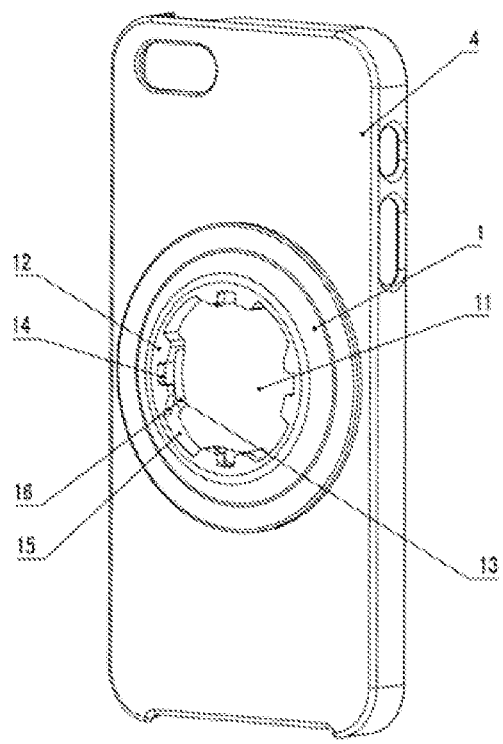
FIG. 2 is a structure schematic view of a first fixing element of the portable rotary self-locking fast-disassembling locker according to the utility model.
Figure 3:
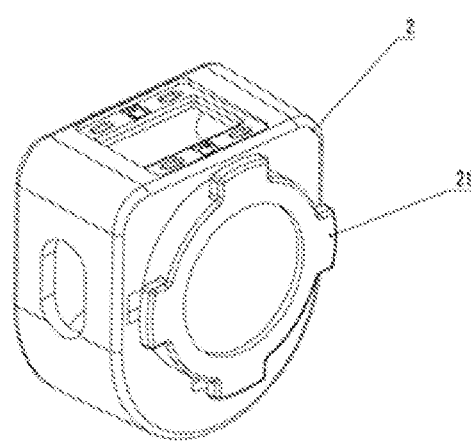
FIG. 3 is a structure schematic view of a second fixing element of the portable rotary self-locking fast-disassembling locker according to the utility model.
Figure 4:
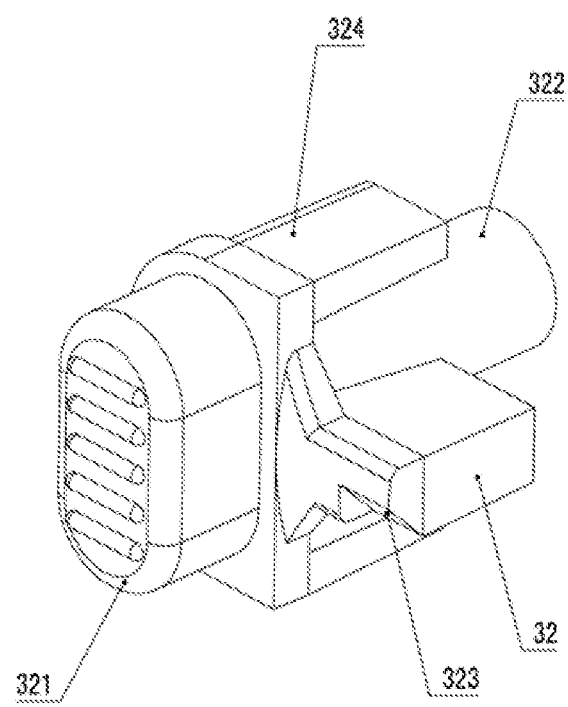
FIG. 4 is a structure schematic view of an elastic locking mechanism of the portable rotary self-locking fast-disassembling locker according to the utility model.

Reference numerals in FIG. 1 to FIG. 4 are as follows: first fixing element 1; embedding recess 11; protrusion portion 12; embedding clamping groove 13; locking groove 14; avoidance gap 15; import bevel 16; second fixing element 2; fixation clamp 21; elastic locking mechanism 3; spring 31; locking portion 32; button 321; spring erection column 322; active import bevel 323; safety latch strut 324; safety latch switch 33; and mobile phone 4.

As shown in FIG. 1 to FIG. 4, a portable rotary self-locking fast-disassembling locker includes a first fixing element 1 and a second fixing element 2. the first fixing element 1 is provided with an embedding recess 11, the side wall of the embedding recess 11 is provided with a protrusion portion 12, the protrusion portion 12 is provided with an embedding clamping groove 13 and a locking groove 14, the embedding clamping groove 13 is located at one side of the protrusion portion 12 close to the bottom of the embedding recess 11, the locking groove 14 is located at one side of the protrusion portion 12 far away from the bottom of the embedding recess 11, i.e., the embedding clamping groove 13 is located at the bottom of the protrusion portion 12, the locking groove 14 is located at the top of the protrusion portion 12, and the two are separately arranged up and down, the second fixing element 2 is connected with an elastic locking mechanism 3, the second fixing element 2 is provided with a fixation clamp 21, the elastic locking mechanism includes a spring 31 and a locking portion 32 connected with the spring 31, the fixation clamp 21 is matched with the embedding clamping groove 13, and the locking portion 32 is matched with the locking groove 14, when the fixation clamp 21 is matched with the embedding clamping groove 13 in place, the locking portion 32 is matched with the locking groove 14 to lock tightly. As shown in FIG. 1 to FIG. 4, the embedding recess 11 is round, at least two protrusion portions 12 are provided and are uniformly arranged along the circumferential direction of the embedding recess 11 in a spacing manner, the protrusion direction of the protrusion portion 12 is to protrude along the radial direction of the embedding recess 11 towards the circle center direction of the embedding recess, an avoidance gap 15 for the fixation clamp 21 to pass is arranged between adjacent protrusion portions 12, and the fixation clamp 21 can be mounted in through the avoidance gap 15, and then rotates to enter the embedding clamping groove 13.

As shown in FIG. 1 to FIG. 4, one end of the embedding clamping groove 13 is an opening, the embedding clamping groove 13 is communicated with the avoidance gap 15 through the opening, and the protrusion portion 12 blocks the other end of the embedding clamping groove 13 to prevent the fixation clamp 21 from continuously rotating and sliding forwards and play a role of circumferential limitation, while the protrusion portion 12 plays a role of axial limitation which can prevent axial separation of the fixation clamp 21, then the locking portion 32 is pushed against in the locking groove 14 through the effect of the spring 31 to prevent reverse rotation and separation of the fixation clamp 21, so that the quick assembling of the first fixing element 1 and the second fixing element 2 is implemented, which may be used for fixation between objects.

As shown in FIG. 1 to FIG. 4, the avoidance gap 15 and the protrusion portion 12 forms an "X"-like concave-convex structure in the embedding recess 11, while the fixation clamp is in a "cross" shape.

As shown in FIG. 1 to FIG. 4, one side of the protrusion portion 12 is provided with an import bevel 16, and the opening of the embedding clamping groove 13 is located at the import bevel 16. As shown in FIG. 1 to FIG. 4, one end of the locking portion 32 is provided with a button 321 matched with the import bevel 16, and the locking portion 32 may be imported through the joint between the active import bevel 323 and the import bevel 16, when one fixing element 1 is rotating, the locking portion 32 rotates synchronously and is acted by the import bevel 16 to overcome the pressure of the spring 31 so as to compress the spring 31, and when the fixing element rotates in place, the locking portion 32 is then pushed into the locking groove 14 under the effect of the elastic force of the spring 31.
the other end of the locking portion 32 is provided with a spring erection column, and the spring 31 is arranged on the spring erection column.

As shown in FIG. 1 to FIG. 4, one end of the locking portion 32 is provided with a button 321, the other end of the locking portion 32 is provided with a spring erection column 322, and the spring 31 is arranged on the spring erection column 322.

As shown in FIG. 1 to FIG. 4, the elastic locking mechanism 3 further comprises a safety latch switch 33, the locking portion 32 is connected with a safety latch strut 323, and the safety latch strut 324 is matched with the safety latch switch 33.

As shown in FIG. 1 to FIG. 4, two locking portions 32 are provided and are respectively connected at the two ends of the spring 31 to form a symmetrical structure.

As shown in FIG. 1 to FIG. 4, the portable rotary self-locking fast-disassembling locker further comprises a mobile terminal, and the first fixing element 1 is internally arranged or externally hung on the mobile terminal As shown in FIG. 1 to FIG. 4, the mobile terminal is a mobile phone 4 preferably, and the first fixing element 1 is a back smart mobile phone back buckle preferably.

The working principle of the portable rotary self-locking fast-disassembling locker provided by the utility model is as follows.

1. A user moves an object attached with the first fixing element 1 close to an object attached with the second fixing element 2, and makes the embedding recess 11 of the first fixing element 1 over against the fixation clamp 21 on the second fixing element 2;

2. the user rotates the object attached with the first fixing element 1 counterclockwise by a certain degree (for example, 45 degrees, makes the avoidance gap 15 on the first fixing element 1 be aligned with the fixation clamp 21 on the second fixing element 2, then vertically abuts and butts the first fixing element 1 with the second fixing element 2 until the fixation clamp 21 completely enters the embedding recess 11 through the avoidance gap 15;

3. when the user rotates the object attached with the first fixing element 1 clockwise, the import bevel 16 of the protrusion portion 12 of the first fixing element 1 will touch the active import bevel 323 of the locking portion 32 on the second fixing element 2, when the import bevel 16 is pressed on the active import bevel 323, a thrust of a 90-degree angle will be produced to make the locking portion 32 retract inwards to compress the spring 31, so that the protrusion portion 12 of the first fixing element 1 can pass through, and the fixation clamp 21 is enabled to enter the embedding clamping groove 13;

4. due to the elasticity of the spring 31, when rotating in place, and the locking portion 32 is inserted into the locking portion 14, the locking portion 32 will automatically rebound to a locking status;

5. at this moment, one side of the protrusion portion 12 in a right angle will bear against the fixation clamp 21; even if the user rotates the first fixing element 1 clockwise again, unlocking cannot be implemented since the locking portion 32 is inserted into the locking groove 14, thus forming the function of locking the second fixing element 2 tightly by the first fixing element 1;

6. to implement an unlocking function, the only way is to press the button 321 on the two sides of the second fixing element 2 to make the locking portion 32 retract inwards, and rotate the object attached with the first fixing element 1 counterclockwise at the same time until the two objects are separated; and 7. in order to avoid accidental separation of the objects due to incautious operation, the utility model is also provided with a safety latch function; as long as the safety latch switch 33 is locked, the button 321 will be locked tightly so that the two objects cannot be separated.

The above contents are further detailed descriptions to the utility model with reference to the specific preferred embodiments, and it cannot be deemed that the specific implementation of the utility model are only limited to these descriptions. Those having ordinary skills in the art of the utility model may also make many simple deductions or replacements without departing from the conceive of the utility model which shall all fall within the protection scope of the utility model.

The invention claimed is:

1. A portable rotary self-locking fast-disassembling locker, comprising a first fixing element and a second fixing element, wherein the first fixing element is provided with an embedding recess where the embedding recess has a bottom and a side wall, the side wall of the embedding recess is provided with a protrusion portion, the protrusion portion is provided with an embedding clamping groove and a locking groove, the embedding clamping groove is located at one side of the protrusion portion close to the bottom of the embedding recess, the locking groove is located at one side of the protrusion portion far away from the bottom of the embedding recess, the second fixing element is connected with an elastic locking mechanism, the second fixing element is provided with a fixation clamp, the elastic locking mechanism includes a spring and a locking portion connected with the spring, the fixation clamp is matched with the embedding clamping groove, and the locking portion is matched with the locking groove.

2. The portable rotary self-locking fast-disassembling locker according to claim 1, wherein the embedding recess is round, at least two protrusion portions are provided and are uniformly arranged along a circumferential direction of the embedding recess in a spacing manner, a protrusion direction of the protrusion portion is to protrude along a radial direction of the embedding recess towards a circle center direction of the embedding recess, and an avoidance gap for the fixation clamp to pass is arranged between adjacent protrusion portions.

3. The portable rotary self-locking fast-disassembling locker according to claim 2, wherein one end of the embedding clamping groove is an opening, the embedding clamping groove is communicated with the avoidance gap through the opening, where embedding clamping groove has another end, and the protrusion portion blocks the other end of embedding clamping groove.

4. The portable rotary self-locking fast-disassembling locker according to claim 3, wherein one side of the protrusion portion is provided with an import bevel, and where the protrusion portion has an opening located on the import bevel.

5. The portable rotary self-locking fast-disassembling locker according to claim 4, wherein one side of the locking portion is provided with an active import bevel matched with the import bevel.

6. The portable rotary self-locking fast-disassembling locker according to claim 1, wherein one end of the locking portion is provided with a button, where the locking portion has an other end provided with a spring erection column, and the spring is arranged on the spring erection column.

7. The portable rotary self-locking fast-disassembling locker according to claim 1, wherein the elastic locking mechanism further comprises a safety latch switch, the locking portion is connected with a safety latch strut, and the safety latch strut is matched with the safety latch switch.

8. The portable rotary self-locking fast-disassembling locker according to claim 1, wherein the spring has two ends and two locking portions are provided and are respectively connected at the two ends of the spring.

9. The portable rotary self-locking fast-disassembling locker according to claim 1, wherein the portable rotary self-locking fast-disassembling locker further comprises a mobile terminal, and the first fixing element is internally arranged or externally hung on the mobile terminal.

10. The portable rotary self-locking fast-disassembling locker according to claim 9, wherein the mobile terminal is a mobile phone.

* * * * *